United States Patent [19]
Poulson

[11] Patent Number: 5,339,726
[45] Date of Patent: Aug. 23, 1994

[54] HOT AIR CIRCULATING OVEN AND FOOD HEATING APPARATUS

[75] Inventor: Larry Poulson, San Ramon, Calif.

[73] Assignee: Cyclofur Company, L.P., San Francisco, Calif.

[21] Appl. No.: 948,298

[22] Filed: Oct. 30, 1992

Related U.S. Application Data

[63] Continuation of Ser. No. 364,627, Jun. 19, 1989, Pat. No. 5,148,737.

[51] Int. Cl.5 .............................................. A47J 37/00
[52] U.S. Cl. ........................................ 99/327; 99/328; 99/335; 99/427; 99/448; 34/186; 126/21 A; 219/400; 219/506
[58] Field of Search ................. 99/327, 328, 334, 335, 99/342, 344, 427, 448, 450; 219/388, 389, 392, 400, 506; 126/21 A; 34/186

[56] References Cited

U.S. PATENT DOCUMENTS

| | | | |
|---|---|---|---|
| 3,421,432 | 1/1969 | Giepen | 99/448 |
| 3,500,742 | 3/1970 | Tanguy et al. | 99/334 |
| 3,541,947 | 11/1970 | Anderson | 99/342 |
| 3,669,002 | 6/1972 | Davidson | 99/427 |
| 3,734,740 | 5/1973 | Zenos | 99/427 |
| 4,036,995 | 7/1977 | Koether et al. | 99/342 |
| 4,155,294 | 5/1979 | Langhammer et al. | 99/427 |
| 4,295,419 | 10/1981 | Langhammer | 99/427 |
| 4,421,016 | 12/1983 | Sich | 99/427 |
| 4,491,065 | 1/1985 | Poulson | 99/427 |
| 4,569,277 | 2/1986 | Stiglich | 99/342 |
| 4,765,232 | 8/1988 | Reid | 99/448 |
| 4,865,864 | 9/1989 | Rijswijck | 99/427 |
| 4,968,515 | 11/1990 | Burkett et al. | 99/327 |
| 5,146,840 | 9/1992 | Hedenberg | 99/328 |

FOREIGN PATENT DOCUMENTS

| | | | |
|---|---|---|---|
| 2532834 | 3/1984 | France | 99/342 |
| 2536633 | 6/1984 | France | 99/327 |

Primary Examiner—Timothy F. Simone
Assistant Examiner—Mark Spisich
Attorney, Agent, or Firm—Hughes & Muller

[57] ABSTRACT

A food heating oven comprising a plurality of perforate food baskets removably mounted to respective prongs of a rotating rod in an oven chamber. Hot air is blown through the oven chamber to heat the food in the baskets. Each prong is color coded, and there are a plurality of individually operable timing devices, each being color coded to correspond to related prongs. Thus, the time that each basket is placed in the oven can be selectively determined, and each basket can at any time be inserted into, or removed from, the oven chamber. This enables a variety of food items having different heating time rquirements to be simultaneously heated in the oven.

10 Claims, 13 Drawing Sheets

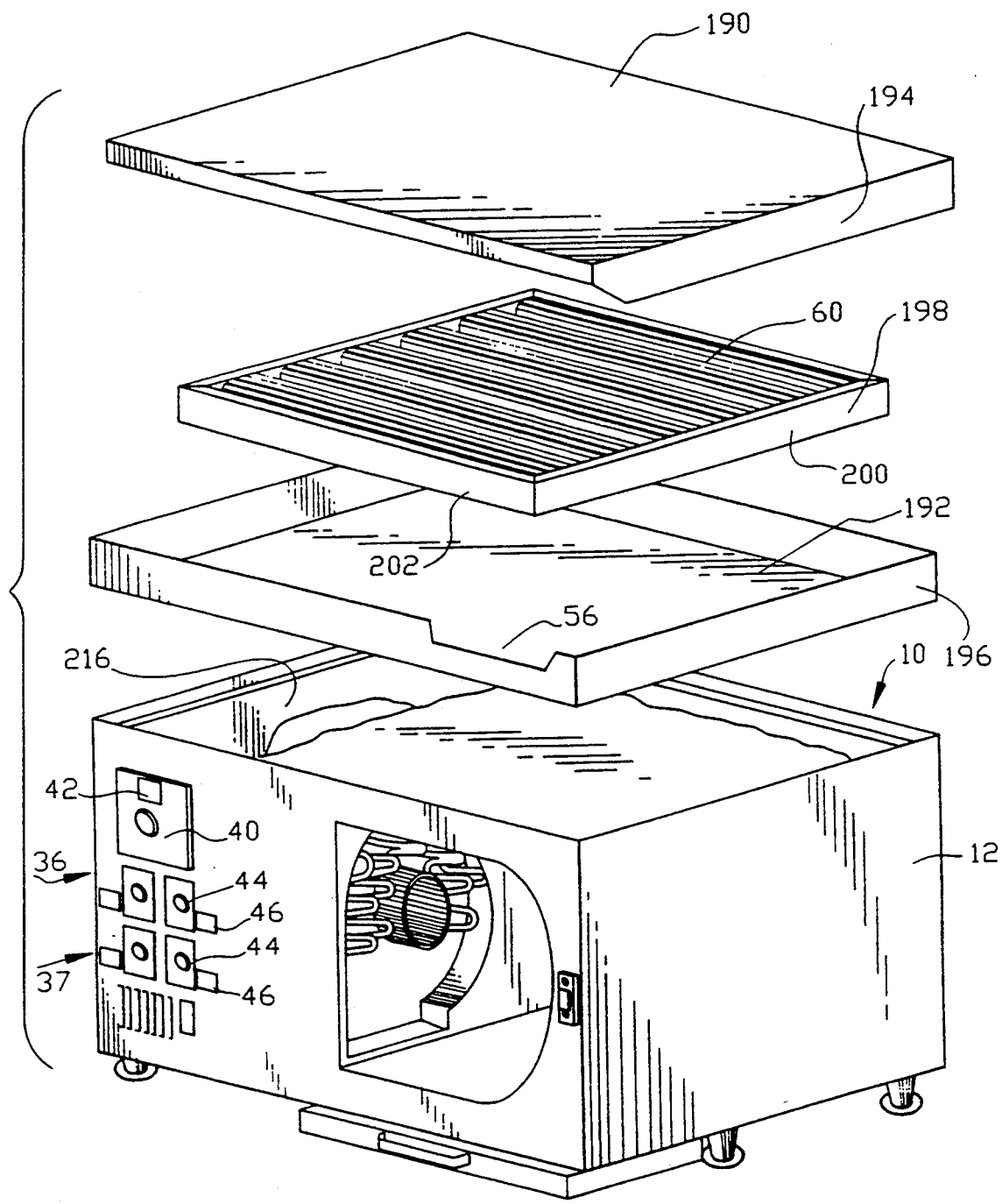

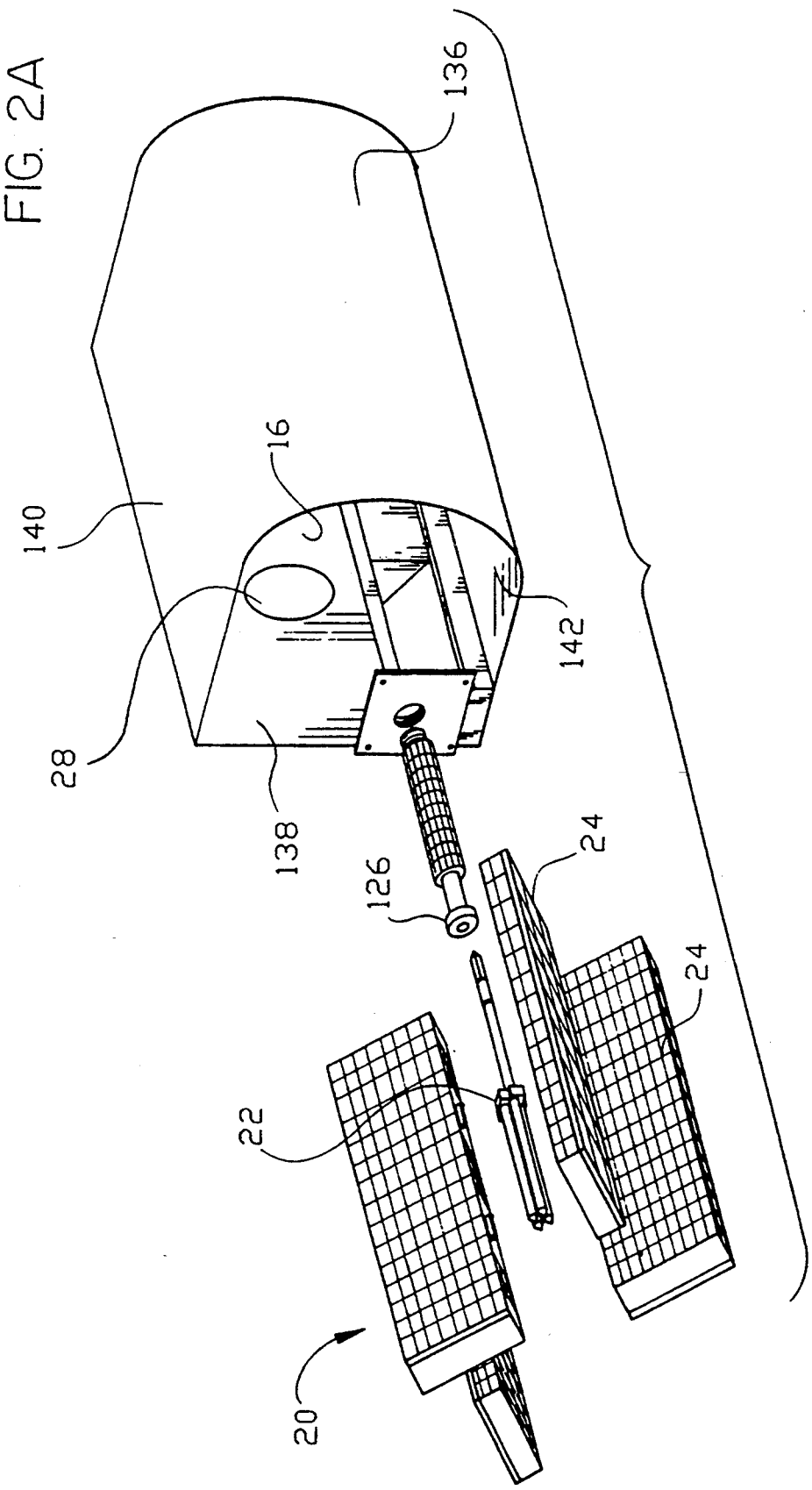

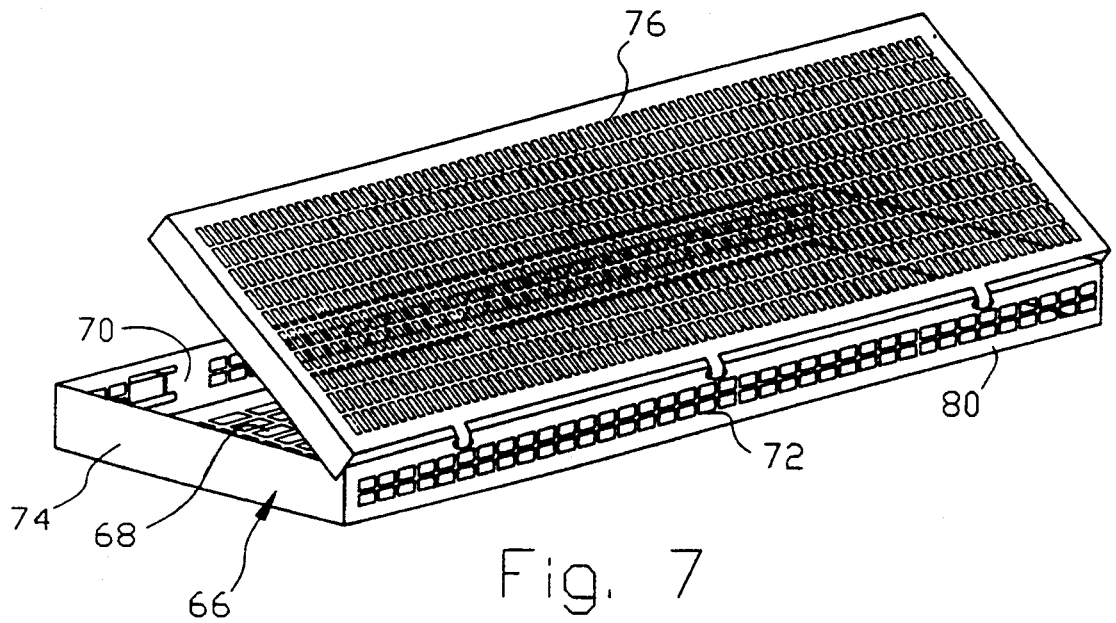
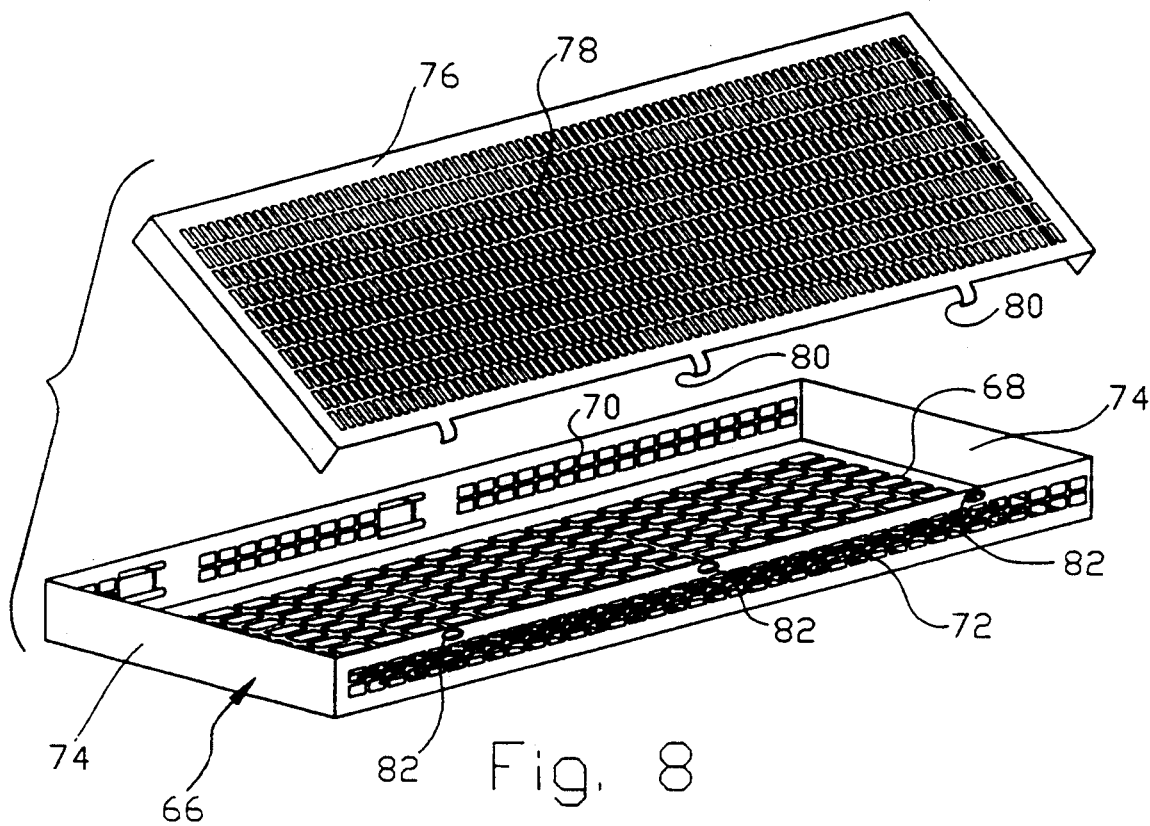

… … …

HOT AIR CIRCULATING OVEN AND FOOD HEATING APPARATUS

This is a continuation, of application Ser. No. 07/364,627, filed Jun. 19, 1989, now U.S. Pat. No. 5,148,737.

BACKGROUND OF THE INVENTION a. Field of the Invention

The present invention relates to ovens for heating food products, and more particularly to an oven in which a variety of food products can be selectively cooked in different time cycles.

b. Background Art

In U.S. Pat. No. 4,491,065, entitled "FOOD HEATING APPARATUS", with the inventor being the same as in the present patent application, there is disclosed a hot air oven which is particularly adapted to cook a food product such as potato pieces in a form which are commonly known as "French fries". An earlier and still more common method of cooking French fries is to deep fry the potatoes (i.e. cut the potatoes into elongate pieces and place these in a wire basket which is lowered into a high temperature cooking oil to cook the potatoes with a crisp fried surface). However, there are a number of drawbacks to that deep fry method of cooking potatoes, such as fire hazards, disposing of the fumes created from the cooking oil, dangers in handling the hot oil, etc. Another consideration is that with increasing emphasis on low fat diets, deep frying in oil is for some people undesirable.

Accordingly, the cooking apparatus of U.S. Pat. No. 4,491,065 provided a hot air oven which alleviated many of the of the problems associated with deep fat frying of potatoes. In this oven, there is provided a heating chamber in which there is positioned a food carrying perforate basket which is rotatably mounted about a longitudinal center axis. In this particular configuration, the basket is formed in two half sections which fit against one another along a central plane coincident with the longitudinal axis of rotation. One half section of the basket is removably mounted to the other section so that it can be slid outwardly to an open position to accept a quantity of potato pieces which are to be cooked, and then slid back into engagement with the other basket section to form a unitary basket structure, after which the basket can be rotated to impart a tumbling action to the potato pieces within the basket.

The oven door is closed, and a fan is operated to circulate air from within the oven chamber through heating coils and thence back into the oven so that the heated air blows through the tumbling potato pieces to cook the same. At the completion of a cooking cycle, the oven door is opened, and the removeable basket section is withdrawn from the oven and emptied so that another batch of potato pieces to be cooked can be placed in the basket half section.

The oven of U.S. Pat. No. 4,491,065 also has control system where there is an on and off switch 150 which energizes the entire system, and also a convection switch 152 which powers the motor that operates the fan to circulate the hot air through the oven. The control system also comprises a timer switch 154 which is rotated to the desired position to time the operation of the oven. A thermostat switch is connected in series with the heating elements to maintain these at the proper temperature. An interlock switch 164 is provided, with this switch 164 becoming conductive by closing the oven door 22. This interlock switch 164 is connected in the series with the aforementioned convection switch 152 and the timer switch 154 so that when the oven door is closed power is delivered to operate the motor 82 which causes rotation of the basket and also to deliver power to the motor 190 to turn the fan which circulates the air through the oven. Thus, when the oven door is opened, air is not circulated through the oven, and the basket does not rotate. There are other specific features of the control system described in U.S. Pat. No. 4,491,065.

Another feature of the oven shown in U.S. Pat. No. 4,491,065 is a circulating system by which expansion air and gaseous substances inside the oven chamber are drawn through a gap like opening above the oven door along with outside air into an upper condensing chamber to condense a high percentage of the condensable material. The remaining gaseous mixture is then discharged by means of a fan to an outside location. Also, there is provided another fan, powered by a motor, to cool the motors and other components located in the oven at a location spaced laterally from the cooking chamber of the oven.

While the apparatus described in U.S. Pat. No. 4,491,065 certainly comprises an oven which serves a very useful function in the cooking art, and while the oven showed in U.S. Pat. No. 4,491,065 can certainly be used with food products other than potato pieces, the inventor in the present patent application recognizes that there are certain cooking applications of a varied nature to which the cooking oven of U.S. Pat. No. 4,491,065 is not readily adapted.

A search of the U.S. patent literature has disclosed a number of other cooking devices of various sorts, some of which provide a plurality of baskets removably mounted to a rotating member. These also have limitations relative to more varied cooking requirements in a restaurant environment. These are the following:

U.S. Pat. No. 4,765,232 (Reid) shows a rotisserie type cooking device where a plurality of food containing baskets is removably mounted by means of clips to a rotating shaft, with these baskets extending radially outwardly from the shaft. A heat source, such as charcoal briquets is placed in the lower part of the housing beneath the rotating baskets.

U.S. Pat. No. 4,723,482 (Weiss et al) shows a sausage heating machine where there is a frame mounted for rotation about a horizontal axis, and there is a plurality of basket members to hold the sausages. Patentability is predicated upon the particular configuration of the basket members which permit the sausage to roll in the basket as the frame is rotated.

U.S. Pat. No. 4,421,016 (Sich) also shows a cooking apparatus where there is a plurality of baskets or food containers which are mounted for rotation about a horizontally extending shaft. Various embodiments are shown. In a first embodiment, there are three such shafts with four baskets on each shaft, with these baskets having a fixed orientation relative to the related shaft. In the embodiment of FIG. 4, each of the individual baskets, in addition to being mounted for rotation about a center shaft, is itself mounted for rotation about a center axis of its own.

U.S. Pat. No. 4,132,216 (Guibert) shows a hot air oven by which a number of prepackaged meals can be heated to a serving temperature. Food trays containing refrigerated food are stacked in a number of sets which are in turn supported from a rotating support frame. These are rotated about a vertical axis, and hot air is circulated through the oven. There is an access port at one side of the oven through which the trays can be inserted into and taken from the oven.

U.S. Pat. No. 3,951,052 (Ringo) shows a barbecuing apparatus where there is a horizontally mounted rotating shaft with a frame to which a plurality of food carrying trays are releasably mounted. As the shaft rotates, these food carrying trays are in turn rotated in a circular path in the cooking chamber. The charcoal fire is located below the food trays, and water is directed at the fire through a plurality of quenching nozzles to control the fire. To retain the baskets in the cooking position, the frame supports the trays and spring arms grip the tray and keep the baskets closed.

U.S. Pat. No. 3,870,193 (Schneider) discloses an automatic vending machine for heated French-fried potatoes in which the French fries are contained in an open ended cage. The cage itself is mounted for rotation about its center axis, and the cage can be tilted about an axis transverse to its axis of rotation so that it can be oriented to receive a load of potatoes, then rotated to a horizontal position for rotation of the cage while heated air is blown through the cage to heat the potatoes, and then moved to a discharge position. A timer is provided to control the length of time of rotation.

U.S. Pat. No. 3,744,402 (Piegza et al) discloses a pressure vessel for uniformly treating articles, such as food products which are sealed in containers, such as glass bottles or metal cans, where the food must be subjected to controlled cooking and/or sterilizing temperatures. The product is contained in baskets which are in turn mounted to a rotatable shaft.

U.S. Pat. No. 3,025,783 (Koudek) shows a rotisserie cooker where there is a rotatable shaft having a square cross-sectional configuration that extends across the cooking area. Individual sleeves 14 are attached to the shaft at spaced locations along the length of the shaft, and individual food containing baskets can be removably mounted to clips 16 connected to each of the sleeves 14. Thus, individual baskets can be selectively mounted to, and removed from, the shaft so that the time period during which the food in the baskets is cooked can be controlled. The arrangement of this apparatus is such that the baskets are necessarily positioned at spaced locations along the shaft, and each basket is properly positioned for removal from the shaft only when it is rotated around to a more forward position.

SUMMARY OF THE INVENTION

The present invention incorporates certain features of my earlier patent, U.S. Pat. No. 4,491,065 in a new system which can effectively operate in a restaurant environment so that a variety of food products having different heating and/or cooking requirements can be conveniently prepared. Further different food products can conveniently be inserted into and removed from the oven at any time, without any set position of the food products being required while providing for the continued proper cooking of food products remaining in the oven. More specifically, the present invention accomplishes this in a manner that a single cooking apparatus can be utilized to simultaneously to cook a number of different food products with the cooking time and cycle of these various food products being selectively controlled depending upon the desired cooking and/or heating times of these various food products.

The present invention comprises a housing defining a heating chamber. There is a carrying assembly adapted to carry the food products which are to be heated in the heating chamber. The carrying assembly comprises a plurality of basket means, each of which is arranged to contain a related food portion to be heated. There is a mounting structure having mounting means by which each of said basket means can be mounted at selected mounting locations within the chamber. Further, the carrying assembly comprises first identifying means which in turn comprises first indicia by which each of the basket means can be identified in the heating chamber.

There is a control system comprising timing means having a plurality of selectively operable timing devices, each of which can be set for a predetermined timing cycle. There is second identifying means corresponding to the first identifying means and having second indicia associated with each of the said timing devices by which each of the timing devices can be selectively associated with individual basket means at the mounting structure. Thus, each basket means can be inserted in the heating chamber, and a related timing device identifiably related with that basket means can be set to a predetermined timing cycle so that a period of time during which that food product is heated in the oven chamber can be ascertained.

In a preferred form, the first indicia comprises a plurality of identifying elements, each of which is identifiably associated with a related mounting location at said mounting structure. Further, the mounting structure comprises a plurality of mounting means, each of which is identifiably associated with a related one of the identifying elements.

In a further preferred form, each of the mounting members comprises a rod means to which a related basket means can be selectively mounted. Further, the mounting structure is rotatably mounted in the heating chamber, and there is drive means to rotate the mounting structure in a manner that each of the basket means mounted to the mounting structure can be rotated in the oven chamber.

The preferred embodiment comprises hot air circulating means arranged to heat air and circulate the air through the oven chamber.

In the preferred form, there is a door for the heating chamber, with the door having a closed position and an open position. The control system comprises interlock switch means which is responsive to opening and closing of the door in a manner that the hot air circulating means becomes operative upon closing of the door and stops operating when the door is open. The timing means is operatively connected to the interlock switch means in a manner that each of said timing devices which is operating through a timing cycle has the timing cycle interrupted during periods of time that the door is open, and each timing cycle is continued when the door is closed. The hot air circulating means is connected to the interlock switch means independently of the timing means in a manner that closing of the door causes the interlock switch means to cause said hot air circulating means to be operative, whether or not selected timing devices are operating through timing cycles.

Each of the timing devices has signal means associated therewith to indicate a condition where its related timing device is operating through a timing cycle. Also, the signal means can be arranged to indicate when its related timing device has completed an operating cycle.

In a preferred form, the control means comprises a main power switch means which is connected in series with the interlock switch means to connect to the hot air circulating means. The interlock switch means is connected to the timing means with a power connection that is parallel to a connection of the interlock switch means to the hot air circulating means. Thus, the hot air circulating means is able to operate under circumstances were the timing means is nonoperative.

In a specific configuration herein, each of the timing devices comprises a related timing switch which enables the relating timing device to go through a timing cycle. The timing switches are connected in parallel with the interlock switch means in a manner that each of the timing switches can be activated independently of other timing switches, and all of the timing switches are inactivated by said interlock switch means moving to an open position to interrupt all timing cycles of said timing devices then in operation. In a preferred configuration, each of the timing devices has a direct power connection to the main power by-passing the interlock switch means.

The housing in the preferred form has a front side and a rear side, with the door being mounted at the front side of the heating chamber. The mounting structure is rotatably mounted in the oven chamber about a longitudinal axis of rotation that is horizontally aligned and extends in a front to rear direction. The mounting locations are at angularly spaced locations relative to the axis of rotation. The mounting means and the basket means are arranged in a manner that each of the basket means can be removably mounted to the mounting means by being moved from a front location of the oven chamber rearwardly into the oven chamber so as to come into mounting engagement with the mounting means, with the mounting means being arranged so that at least two of the basket means can be mounted simultaneously at respective mounting locations.

In a specific configuration herein, the mounting means comprises a plurality of longitudinally extending rod means, each being adapted to come into mounting engagement with a related one of the basket means. In this form, the first indicia comprises a plurality of identifying elements, each of which is associated with a related one of the rod means.

The preferred form of the basket means is that each basket comprises a main basket section and an openable lid to close the main basket section. The lid and main basket sections each has securing bracket means which come into securing alignment when the lid is in a closed position. The securing bracket means are arranged, with the lid in the closed position, to come into securing engagement with a related one of the rod means in a manner that the lid is held in the closed position and the basket means is mounted to its related rod means for rotation with the mounting means. In a preferred form, the securing bracket means and the rod means is provided with tongue and groove securing means which come into interfitting engagement. More specifically, bracket members of the lid and the basket section are provided with openings which are aligned when the lid is in the closed position, with the rod means extending through the aligned openings to secure the lid to the main basket section.

Desirably the mounting means has at each mounting location an alignment surface means positioned to come into engagement with an adjacent surface of the basket means when the basket means is in engagement with its related rod means, so as to securely position the basket means relative to the mounting means. In the preferred form, each of the rod means is positioned adjacent to, and radially outwardly from, a related one of the surface alignment means, and each of the rod means, in being positioned through aligned openings of the related brackets, positions a mounting surface of the basket means against the surface aligning means of the mounting structure. Thus, the brackets of the basket means come into engagement with the rod means by being moved rearwardly into engagement with the rod means.

More specifically, the mounting structure has an alignment block means, having surface portions which comprise the surface alignment, and these are positioned circumferentially around the alignment block means. Each rod means extends forwardly from the alignment block means, with each rod means being positioned adjacent to a related one of the surface portions of the alignment block means.

Also, in a preferred form, the mounting structure comprises a longitudinally aligned mounting sleeve mounted to a rear portion of the housing and extending forwardly in the heating chamber. This sleeve means has a longitudinal through opening, and the mounting structure comprises a mounting shaft means positioned in the mounting sleeve means. The shaft means has a rear end coupled to a drive element which causes rotation of the mounting means. The mounting structure has a forward mounting portion comprising the mounting means which is fixedly secured to the shaft means.

In a specific configuration, the shaft means has a circumferential retaining groove, and the mounting sleeve means has a retaining finger means extending into the retaining groove so as to restrain axial movement of the shaft means along the longitudinal axis. The sleeve means is moveable forwardly relative to the housing, in a manner that the rear end of the shaft means becomes disengaged from the drive member so as to permit lateral movement of the shaft means in the sleeve means, with lateral movement of the shaft means causing disengagement with the retaining finger means so that the rotatable mounting structure can be removed from the sleeve means.

The apparatus further comprises the oven housing section that defines the heating chamber, and there is air circulating fan means having an intake opening to withdraw air from the heating chamber. Air heating means comprising heating element means is positioned to receive air from the fan means, and the housing section defines air nozzle opening means arranged to receive heated air from the heating means and to discharge said heated air along a discharge flow path into said heating chamber. There is flange means extending transversely to said flow path in a manner to define a dead air space spaced from the flow path to receive food particles carried by air circulating through the heating chamber.

In a preferred form, the flange means defines a food receiving recess which opens in a forward direction toward a front end of the heating chamber in a manner that food particles collected in the dead air space can be removed forwardly from the oven chamber. Desirably, there is a tray mounted in the housing below the oven chamber, with this tray being mounted in a position extending forwardly of the heating chamber at lower location, so that food particles, grease and water removed from the dead air space can fall into the tray. This can be attached to a drain system.

Specifically the flange means comprises at least one upper flange member positioned adjacent to and extending upwardly from the flow path to define channel means to receive the food particles. Also, there is a lower flange member positioned adjacent to a lower portion of the flow path and extending upwardly into the flow path to provide a lower dead air space.

Also in the preferred configuration, the housing section comprises a removeable housing insert which defines the heating chamber. This housing insert has a wall defining a through opening though which air flows from the heating chamber into the intake opening of the fan means. The housing defines an air circulating chamber which is spaced laterally from the housing insert and which contains a fan means and the heating element means. The housing has a circumferential flange positioned circumferentially around the air circulating chamber and extending inwardly toward the opening in the wall of the housing so as to be adjacent to said wall of the housing insert.

Other features that have become apparent from the following detailed description.

BRIEF DESCRIPTION OF THE DRAWINGS

FIG. 2 is an isometric, exploded view, similar to FIG. 1, showing some of the upper components separated for purposes of illustration, with the front door and also the oven insert not shown;

FIG. 2A is an isometric view showing the oven insert separately from the oven housing, and also showing the separate components of the food carrying assembly;

FIG. 7 is an isometric view of one of the food carrying baskets of the present invention, with the lid being connected to the main basket structure;

FIG. 8 is an isometric view similar to FIG. 7, but showing the lid removed from the main basket structure;

DESCRIPTION OF THE PREFERRED EMBODIMENT

Figure 1:
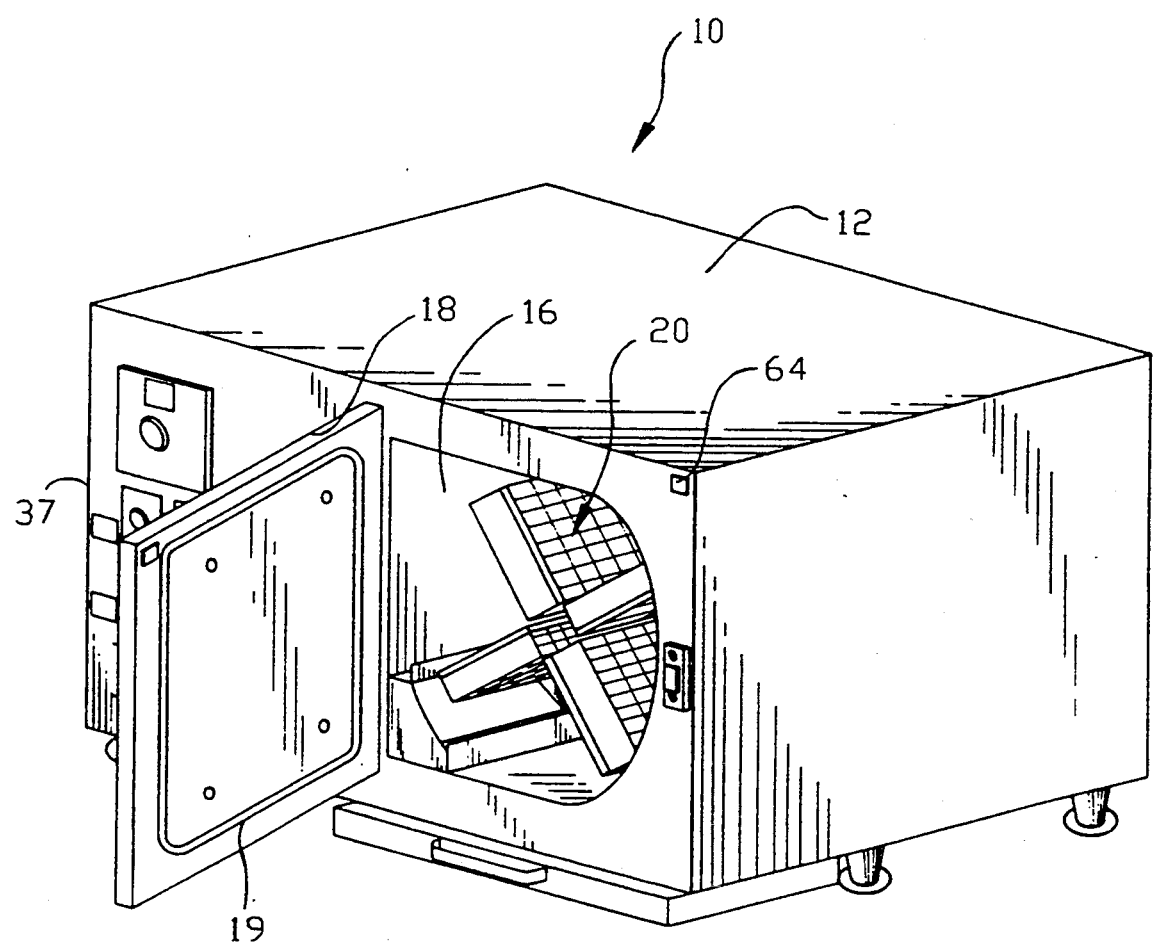
FIG. 1 is an isometric view of the present invention taken from a forward location moderately above and to the right side of the front of the oven of the present invention.

It is believed that a clearer understanding of the present invention will be obtained by first describing the main operating components of the present invention, and then describing the basic operation of these components in a typical restaurant operation. This will be followed by a detailed description of the various components of this apparatus, and how these operate and cooperate with one another to accomplish the functions of the present invention.

To describe the overall structure, the oven 10 comprises a housing 12 in which is removably mounted an oven insert 14 that defines an oven chamber 16. (See FIGS. 2B and 3). An oven door 18 is hinge mounted to provide access to the oven chamber 16 and also to close the chamber 16. The door 18 has a peripheral seal 19 at its interior surface.

There is a food carrying assembly 20 (see FIGS. 1 and 2A) which is made up of a mounting rod 22 and a plurality of food carrying baskets 24 that are removably mounted to the mounting rod 22. In the assembled position, this rod 22 is horizontally positioned in the oven chamber 16 and aligned in a forward to rear direction. (See FIG. 3). The rear end of the rod 22 is mounted to a suitable drive member that rotates the rod 22.

In the present preferred configuration, four baskets 24 can be removably mounted to the rod 22 at any one time. In the mounted positions, the baskets 24 extend radially outwardly from the rod 22 and are maintained at fixed angular positions spaced 90° from one another.

There is an air circulating and heating system 26 (See FIGS. 2, 2B and 3) to move hot air through the oven chamber 16 to cause heating and/or cooking of the food product in the baskets 24. More specifically, there is provided an opening 28 in the left side wall of the oven insert 14 through which air is drawn into a squirrel cage fan 30 (see FIGS. 2 and 2B). The fan 30 directs the air through a plurality of heating elements 32, and the hot air is discharged through a slot like outlet opening 34 back into the heating chamber 16, with this hot air passing through the food contained in the baskets 24.

The oven 10 further comprises a control system 36 (See the circuit diagram of FIG. 12), having a control panel 37 where the various control members are mounted on the front left face of the housing 12. More specifically, this control system comprises a main power switch 38, a thermostat 40 with a digital readout 42, and four individual timing switches 44. Each timing switch 44 has an associated color coded operating button 46, with these four buttons being in this particular embodiment colored yellow, green, red and blue, respectively.

Figure 6:
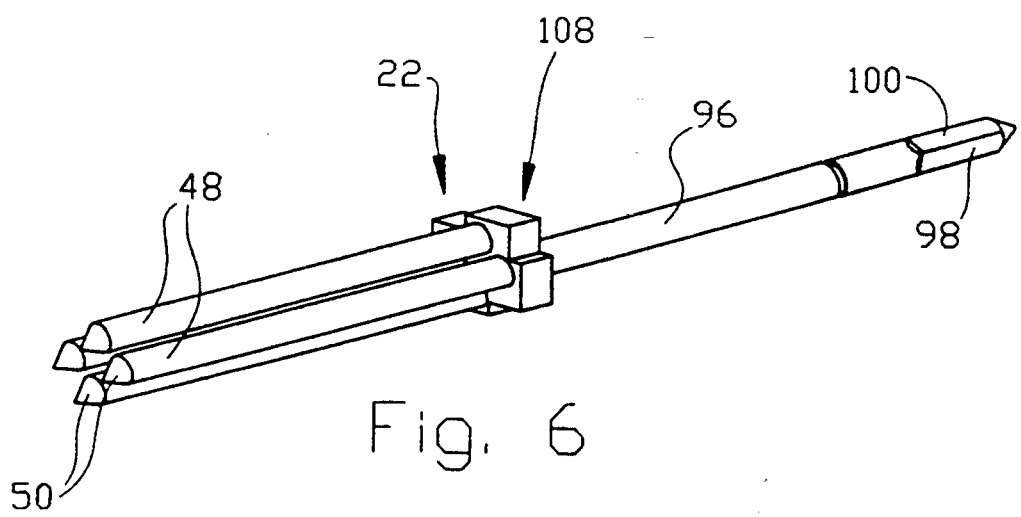
FIG. 6 is an isometric view of a basket mounting rod of the food carrying assembly.

With reference to FIG. 6, it will be noted that the forward end of the mounting rod 22 is formed with four elongate, forwardly facing parallel prongs 48 arranged in a square configuration, each of these prongs 48 being arranged to engage a related basket 24. The forward tip end 50 of each of these prongs 48 is provided in the form of a colored porcelain material, with the color of each prong corresponding to the color of the patch 46 of a related one of the timing switches 44. (For convenience if illustration, these tips 50 are not shown in FIG. 1.)

The oven 10 also has a venting system which can best be described with reference to FIG. 4. It will be noted that the upper edge of the door 18 in its closed position provides a small slot like passage 54 leading from the oven chamber 16 over the top edge of the door 18. There is a second slot like opening 56 leading from a location just above the door into an upper planar condensing chamber 58. Positioned in this chamber 58 is a set of baffles 60 (see FIG. 2) positioned so that the air which moves from the oven chamber 16 through the slots 54 and 56 passes rearwardly through these baffles 60 to the rear part of the chamber 58. With reference to FIG. 3, ambient air mixes with air and other gaseous material from the oven chamber 16 and passes through the baffles 60 to cool and condense such material, with the remaining cooled air being drawn into an exhaust fan 62 and discharged to some outside location. (For convenience of illustration the baffles 60 are not shown in FIG. 4.)

Also, it will be noted that the front face of the housing 12 has an interlock switch 64 that is positioned to be engaged by a magnetic element 65 on the door 18 when the door 18 moves to its closed position. Thus, when the door 18 is closed, the interlock switch 64 closes so that power is delivered to certain operating components of the oven 10, and when the door 18 is opened, power to these same components is interrupted.

With the foregoing in mind, let us now review the general operation of the present invention as it might be used in a typical restaurant operation.

As a preliminary comment, it has to be recognized that there are large number of food products which lend themselves to heating and/or cooking by means of hot air. As indicated previously potato particles (e.g. French fried potatoes) can very conveniently be cooked by this method. Also, as further examples, hamburger pads, chicken, steak and other meat products can be heated by hot air.

However, the cooking or heating cycle for these various food products may be rather different. For example, a serving of French fried potatoes will take between one and one half to three and one half minutes to cook, depending on the size of the serving, the thickness of the individual potatoes pieces, and whether these are fresh on frozen.

A hamburger pattie might take between one and one half to six minutes to cook; A large steak may take between five to twelve minutes. Another consideration is that restaurant orders come in sequence, so that one order might be placed in the oven at one time, another order at a short time later, etc. Thus, if a hot air oven is to be used in a restaurant type operation (or in any other environment where the cooking or heating cycles of the food is different and where the timing of initiating the cooking cycle varies), it must have a mode of operation compatible with these conditions.

To review now a typical operation of this oven 10 in a restaurant, at the start of the operation; the thermoset 40 is set to the desired operating level; the main power switch 38 (the "on-off" switch) is closed, and with the door 18 closed this will cause the entire system to become operative. More specifically, the mounting rod 22 will begin to rotate; power will be delivered to the heating elements 32 to raise their temperature; and the air circulating fan 30 will blow the hot air through the oven chamber 16. Further, the exhaust fan 62 will become operative to draw air into the condensing chamber 58, and another fan (not mentioned previously) will operate in an area where two of the motors are located to provide cooling air for these and also other components of the control system.

Let it now be assumed that two orders of four ounce French fries are taken. The two batches of French fries are placed in one basket 24, the lid of the basket 24 is closed, and the door 18 is opened. When the door 18 is opened, the interlock switch 64 is moved to its open position to interrupt power to the motors that rotate the mounting rod 22 and drive the squirrel cage fan 30. Also power to the heating element 32 will be interrupted. Then the basket 24 with the fries therein is aligned with one of the prongs 48 of the rod 22 and moved into engagement with that prong 48 so that the basket 24 becomes mounted to the rod 22 so as to extend radially outwardly therefrom. The operator observes the color of the tip 50 of the prong 48 on which the basket 24 is mounted, and the operation sets the timer of that switch 44 having the same color coding on its button 46 to the appropriate time interval corresponding to the desired cooking time for that order of French fries. Or the appropriate time interval could be preset. The operator then presses the color coded switch button that corresponds to the color of the prong tip 50 at which the basket 24 is mounted, causing the light associated with that switch to light up, and then shuts the door 18. Shutting the door 18 closes the interlock switch 64 to cause the two motors to start operating to rotate to the squirrel cage fan 30 rotate the rod 22, and also to deliver power to the heating elements. At the same time, when the door 18 is closed, the timing mechanism on the selected switch 44 begins to count time.

Let it now be assumed that a half a minute later three hamburgers are to be cooked, and that the selected cooking period for these is five minutes. The three hamburgers are placed in a second basket 24, the oven door 18 is opened, and the second basket 24 is placed on a second prong 48 in the oven chamber 16. At the time the door 18 is opened, the interlock switch 64 opens to stop rotation of the rod 22, stop the operation of the squirrel cage fan 30, and stop power to the heating element 32. At the same time, an interrupt signal is sent to the first selected timing switch 44 so that it stops counting time. A second timing switch 44 is selected having a color coding corresponding to the color on the tip 50 of the prong 28 on which the second basket 24 is mounted, and this second timer is set for five minutes and it control button 46 is pushed. When the oven door 18 is closed, then the squirrel cage fan 30 begins to operate, the mounting rod 22 begins to turn, and power is delivered to the heating element 32. At the same time, an activating signal is sent to the two selected timing switches 44 to cause these two switches 44 to again begin counting through their timing cycle.

It will be noted that during the time interval that the door 18 is opened a second time, the first selected timing switch 44 stops counting for the interval that the door 16 is opened. The reason for this is that when the door 18 is open (with the squirrel cage fan 30 not operating in the oven chamber 16), there is very little heat exchange taking place between whatever hot air there is in the oven chamber 16 and the French fries in the first basket. However, when the oven door 18 is again shut so that the hot air is then immediately circulated through the oven chamber 16, the cooking operation continues.

When the timing switch 44 that was set in connection with the French fried potatoes reaches the end of its timing cycle, then the light associated with that particular switch 44 goes out or begins flashing, and the operator then knows that it is time to remove the French fries from the oven chamber 16. Alternatively, (or in addition to the visual signal), there could be another type of signal, such as an audible signal (e.g. a "beeping" sound). The door 18 is opened to again stop the squirrel cage fan 30 from operating, and also to stop rotation of the mounting rod 22, and the tip 50 of the prong 48 on which the first basket 24 is mounted is readily identified since the color on that tip 50 is the same as the color on the operating button 46 of the switch 44 which has just gone out or begun to flash or give some other signal. Then the operator simply removes the basket 24 on that particular prong 48, with this necessarily being the first basket 24 into which the first order of French fries was loaded and which was initially placed into the oven chamber 16.

It can really be appreciated that during a peak operating time of a restaurant, dozens of different orders can be taken in different sequences and at different time intervals. The present invention provides a system where the operator can be taking orders, placing various baskets 24 with orders into the oven, pulling various baskets 24 out of the oven chamber 16 at the end of the appropriate cooking cycles, and then serving these orders, with the selected timing cycle for each order of food being properly controlled. Further, in the system of the present invention, interruptions in the cooking cycle due to opening of the door 18 and brief interludes of non-operation of the air blowing motor 30 are taken into account so that each order of food is cooked for the selected time period, in spite of such interruptions.

Now there will be a more detailed description of each of the main components of the present invention.

Figure 9:
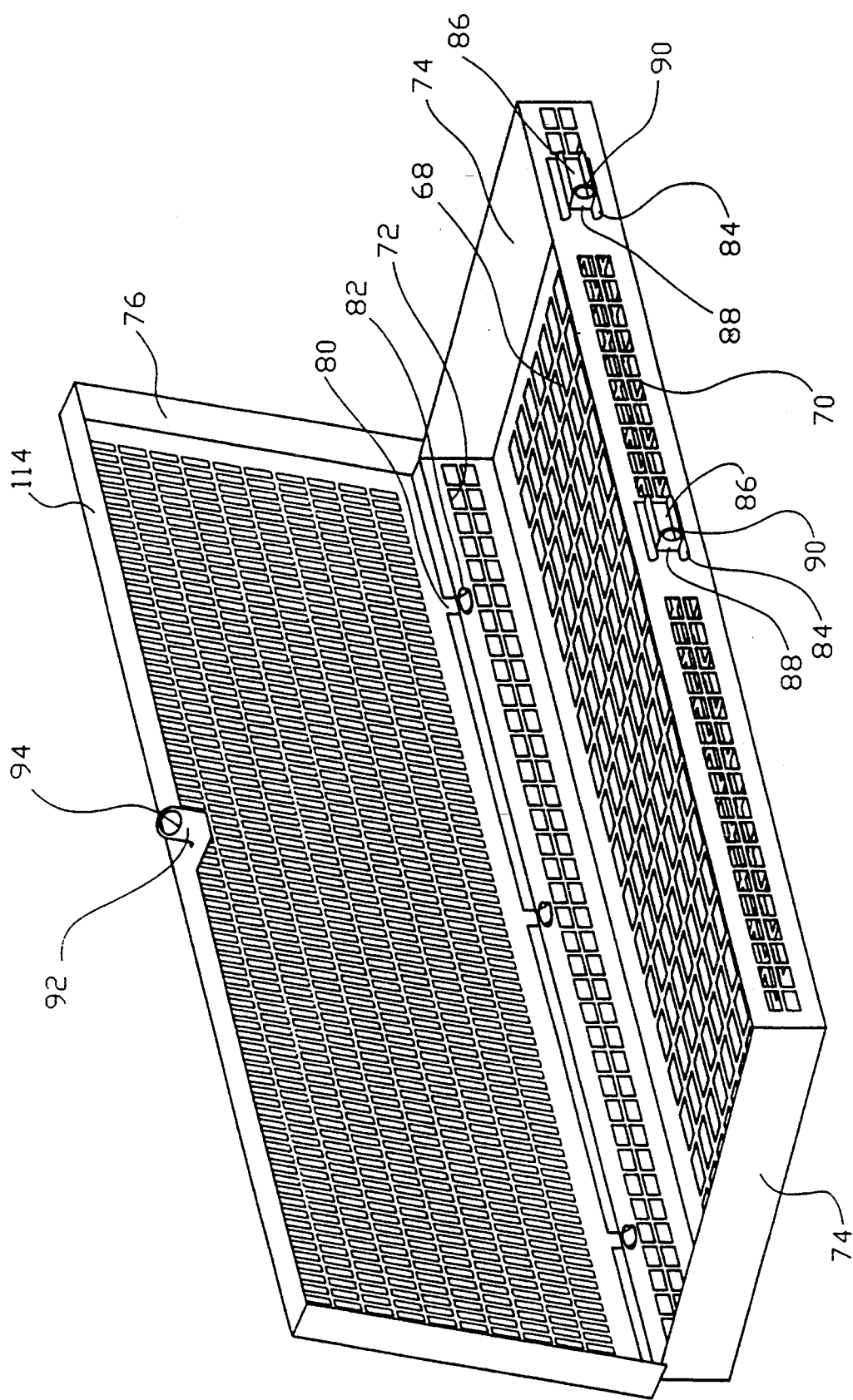
FIG. 9 is an isometric view of the basket of FIGS. 7 and 8, but taken from a location opposite to that of FIG. 7.

The baskets 24 of the present invention are illustrated in FIGS. 7 through 9. Each basket 24 comprises a main basket portion 66 having a perforate bottom wall 68, two perforate side walls 70 and 72, and imperforate end walls 74. The imperforate end walls 74 help channel the hot air flow through the basket 24, thus improving heat transfer with the food product, and helping to avoid impingement of the air flow on the inside door surface and its associated seal. There is a lid 76 which has a main perforate plate portion 78, and three hinge fingers 80 by which the lid 76 is removably hinge mounted to the wall 72 by the fingers 80 fitting in openings 82 in the upper edge of the wall 72. With reference to FIG. 9, it can be seen that there are two mounting brackets 84, mounted one to the middle and one to one end of the basket wall 74. Each bracket 84 defines a related slot 86 to receive a related one of the prongs 48, and each also has a laterally extending tab 88 with a through opening 90 to receive the prong 48.

Also, the lid 76 has a laterally extending tab 92 which has a through opening 94. When the lid 76 is moved to its closed position, the tab 92 comes into alignment with the brackets 84 so that the opening 94 is in alignment with the openings 90 of that brackets 84.

Thus, it is readily seen that with the lid 76 closed, and with one of the prongs 48 extending through the two openings 90 and also through the opening 94, the prong 48 holds the lid 76 securely in the closed position. Also the tabs 88 and 92 can be formed a sleeves of a half inch to an inch in length to provide more structural strength and bearing surface for mounting the bracket 24.

Figure 6A:
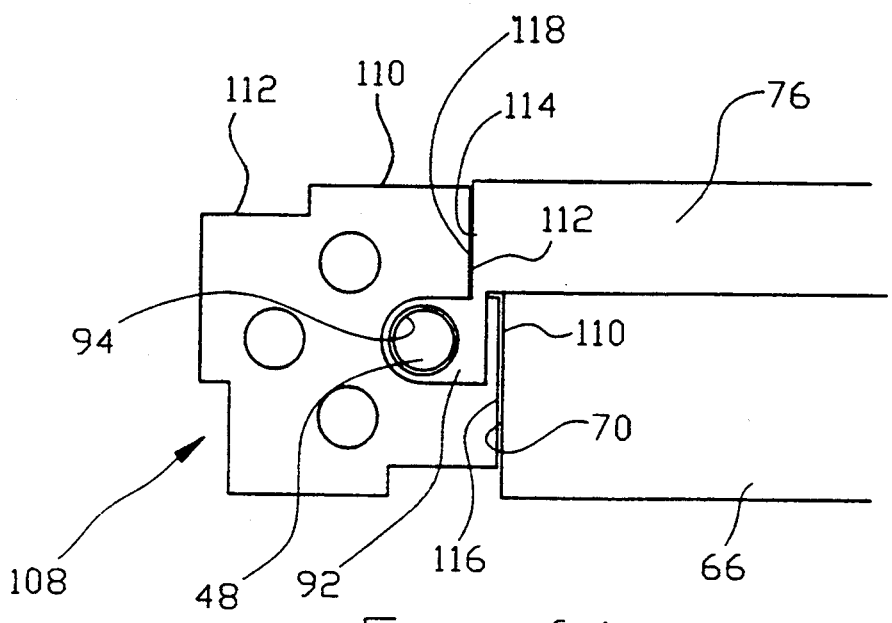
FIG. 6A is a sectional view of the basket rod of FIG. 6, showing a portion of an individual food basket which is mounted thereto, and illustrating the interconnection of the lid with a related prong component of the rod.
Figure 6B:
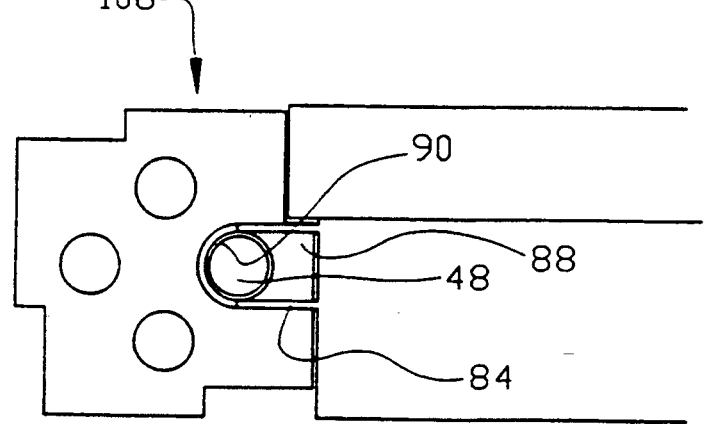
FIG. 6B is a sectional view similar to FIG. 6A, but taken at a different location to illustrate the interconnection of the main basket structure with the prong of the rod of FIG. 6.

Attention is now directed to FIGS. 6, 6A and 6B which show the mounting rod 22 in more detail. It can be seen that the rod 22 has a rear shaft portion 96 having a cylindrical configuration, and there is a rear drive engaging end 98 having flat lateral surfaces 100 to fit in driving engagement within a socket 102 of a drive member or coupler 104 (see FIG. 10) which is mounted within a back wall 106 of the housing 12.

Fixedly secured to the forward end of the shaft portion 96 is an alignment block 108, and the four prongs 48 are fixedly secured to, and extend forwardly from, this alignment block 108. As can be seen in FIGS. 6A and 6B, this alignment block 108 has a generally square configuration, with four side surfaces 110. In addition, each side surface 110 has a small right angle cutout to form a flat surface 112 which is offset radially inwardly with respect to the surface 110 toward the center of the square configuration of the block 108. The reason for each cutout 112 forming the surface this is to accommodate the front edge flange 114 of the lid 76. Thus, as can be seen in FIG. 6A, the front surface 116 of the side wall 70 of the main basket portion 66 fits against the surface 110, and the front surface 118 of the lid flange 114 fits against the surface portion 112 of the block 108.

FIG. 6A illustrates the prong 48 engaging the lid bracket 92, with the prong 48 extending through the opening 94 of the bracket. In FIG. 6B, there is shown the prong 48 extending through the opening 90 of one of the tabs 88 of the bracket 84.

To summarize briefly the manner in which the baskets 24 are mounted to the rod 22, when the basket lid 76 is closed, the three openings 90 and 94 are aligned with one another, and the basket 24 is positioned so that these openings 90-94 are in alignment with the selected one of the prongs 48, and also aligned so that the basket surfaces 116 and 118 are aligned with the surfaces 110 and 112 of the alignment plate 108 adjacent to the selected prong 48. When this is done, the basket 24 is moved rearwardly into the oven chamber with the selected prong 48 coming into engagement with the brackets 84 and 92. At the same time, the surfaces 114 and 116 come into engagement with the alignment block surfaces 112 and 110 adjacent to the selected prong 48 so that the basket 24 is held in a fixed position extending radially outwardly from the longitudinal center axis of the rod 22. It will be noted that the alignment of the rod 22 is in a forward to rear direction, with the tip ends 50 of the prongs 48 pointing toward the open front end of the oven chamber 16. Thus, any one of the four baskets 24 that may be mounted in the oven chamber 16 can be removed from the oven chamber 16 or moved back into the chamber 16 in proper engagement with the rod member 22, no matter what angular position the rod number 22 may be in.

In order to securely mount the rod member 22 in the oven chamber 16, there is provided a cylindrical mounting sleeve 120 having a knurled outer cylindrical surface 122. The sleeve 120 has a longitudinal through opening 124 to receive the shaft portion 96 therein. The forward end of the sleeve 120 has a mounting insert 126 which has a close tolerance fit within the forward end of the shaft portion 96 to permit rotation of the shaft portion 96 within the sleeve 120, and yet hold the shaft portion 96 in proper alignment with reasonable firmness. In the preferred form, this insert 126 is a metallic member press fitted into the forward end of the sleeve 120, but it could also be made as a ceramic member. (For purpose of illustration, the insert 126 is shown spaced forwardly a short distance from it seated position in the sleeve 120. The sleeve 120 also secures the oven insert 14 in its installed position.

The rear end 128 of the sleeve 120 is formed with exterior threads, and this screws into a mounting member 130 fixedly attached to the back wall 106. The rear end 98 of the shaft portion 96 extends rearwardly through and beyond the mounting member 130 and engages the aforementioned coupler or drive member 104.

Figure 10:
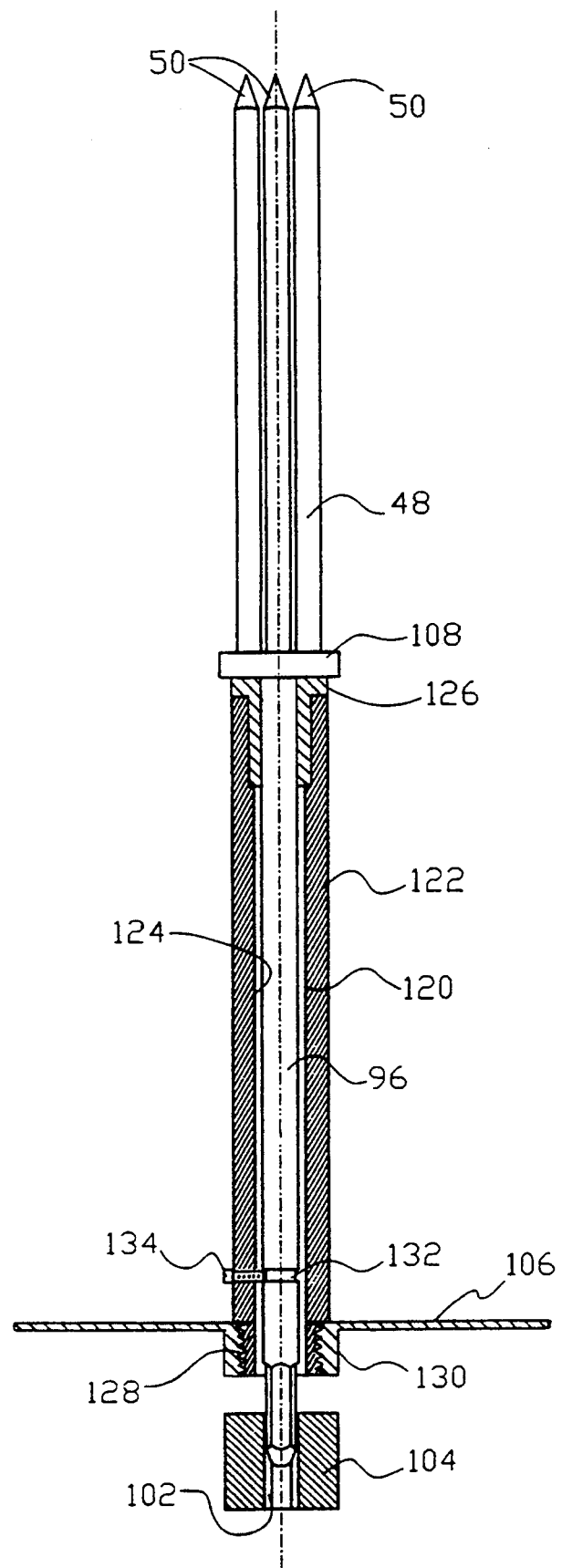
FIG. 10 is a view taken partly in sections along the longitudinal axis of the basket carrying rod member, and illustrating the manner in which the rod member has a drive connection to its related drive element.

To properly position the mounting member 122 relative to the mounting sleeve 120, a rear part of the shaft portion 96 is formed with a circumferential groove 132, and this engages the inner tip of a locating screw 134 which extends through the sleeve 120. In the position of FIG. 10, it can be seen that the shaft portion 96 is held securely within the mounting sleeve 120, but yet is permitted to rotate therein.

Figure 11:
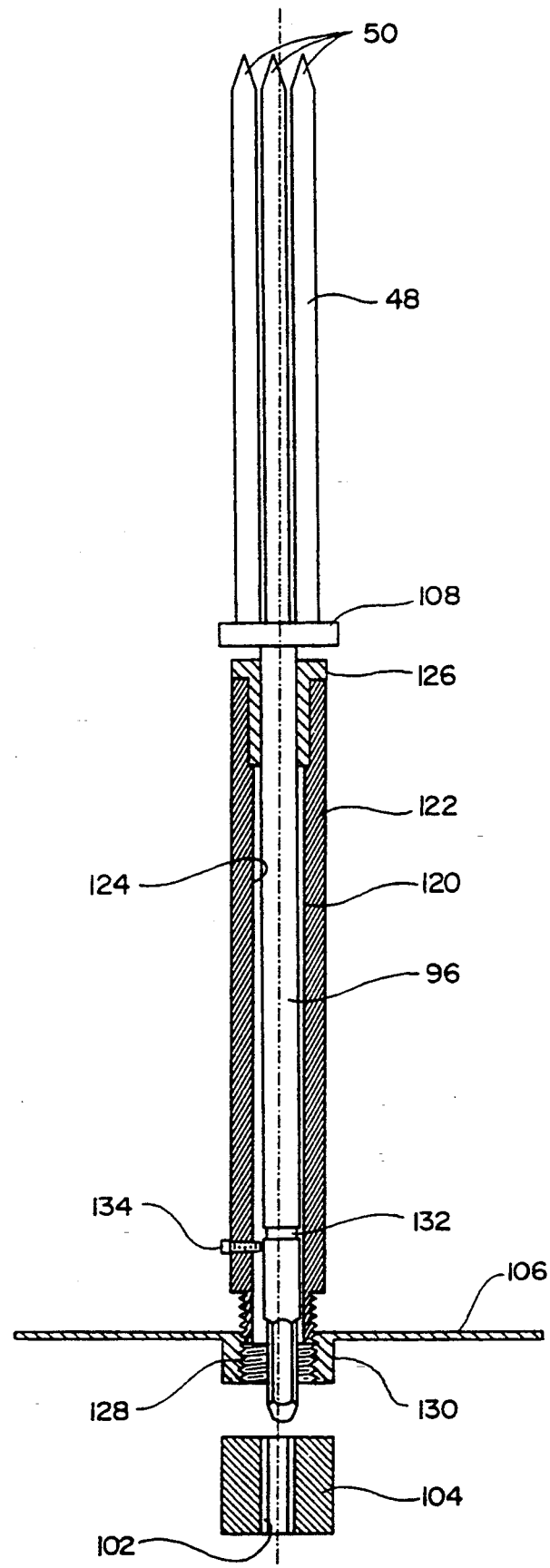
FIG. 11 is a view similar to FIG. 10, but showing the manner in which the rod member can be removed from the drive member and also removed from the oven chamber.

It may be advisable from time to time to remove the mounting rod 22 from the oven chamber 16, either for cleaning, possibly to mount other equipment in the oven chamber 16, or to remove the oven insert 14. This can be accomplished quite easily by rotating the mounting sleeve 120 so as to unthread the rear end of the mounting sleeve 120 from the mounting nut 130, as shown in FIG. 11. When the mounting sleeve 120 has moved a sufficient distance forwardly (either partially unthreaded or totally unthreaded from the mounting nut 130), the rear end 98 of the shaft portion 96 is out of engagement with the drive member 104 so that the rear end of the shaft portion 96 can be moved laterally a short distance so as to be out of engagement with the retaining screw 134. Then the rod member 22 can easily be moved totally away from the mounting sleeve 120.

Each of the aforementioned colored tips 50 of the prongs 48 is made in a manner so that the colored end material is durably formed. This can be accomplished by drilling a hole in each of the forward ends of the prongs 48, tapping the hole, and threading in a porcelain tipped end piece 50 of the desired color.

The aforementioned oven insert 14 is desirably made of stainless steel and has a right side wall 136 which in transverse section has a semi-circular configuration, a left flat wall 138, an upper wall 140, a lower wall 142 and a rear wall 144. The left wall 128 is formed with the aforementioned inlet opening 28 which leads into the middle of the squirrel cage fan 30. The interior of the oven housing 12 is formed with a matching chamber (see FIG. 2) to snugly receive the insert 14 therein.

Figure 2B:
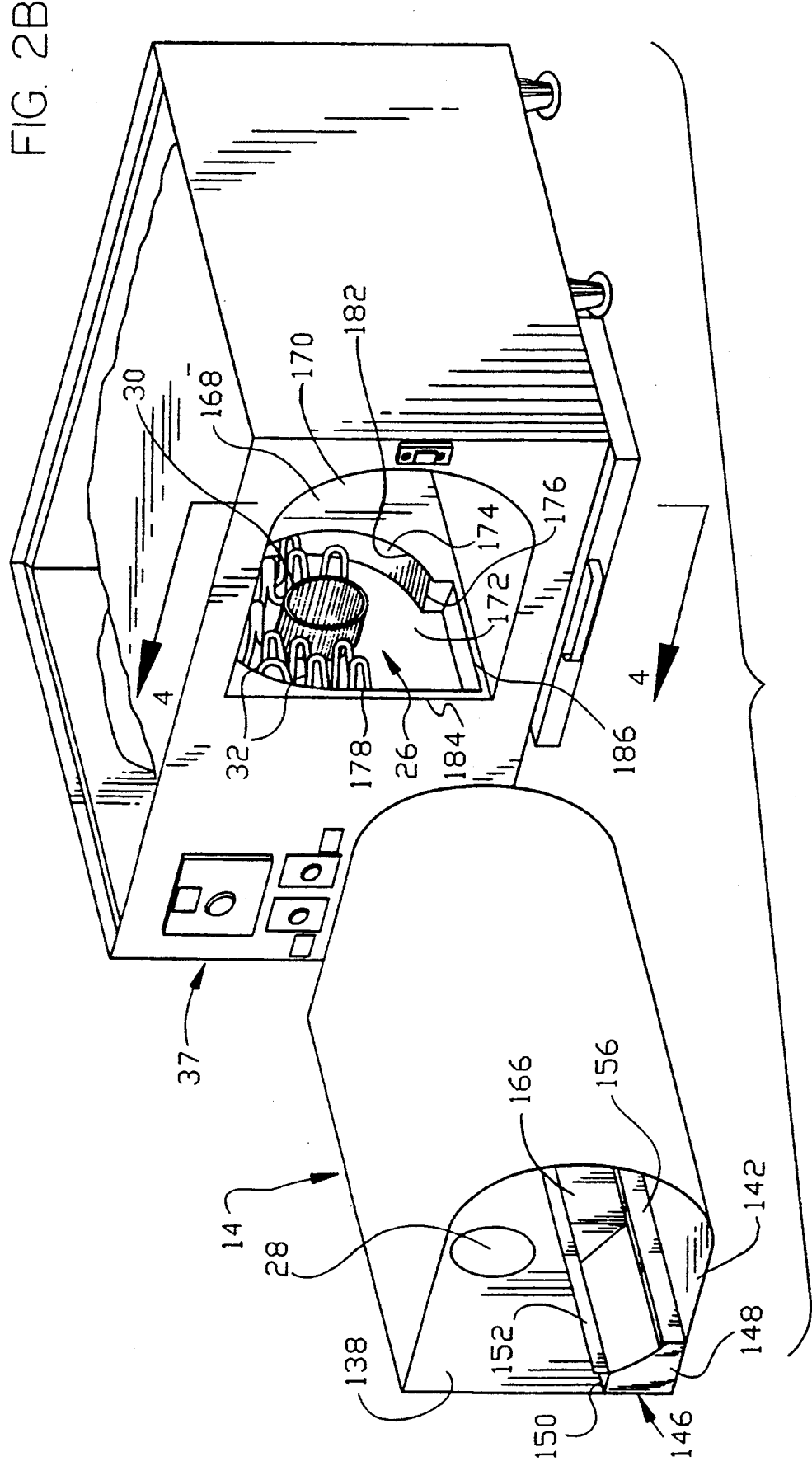
FIG. 2B is a view similar to FIG. 2, showing the oven insert removed, but not showing the oven door nor the upper components that form a condensing chamber.
Figure 3:
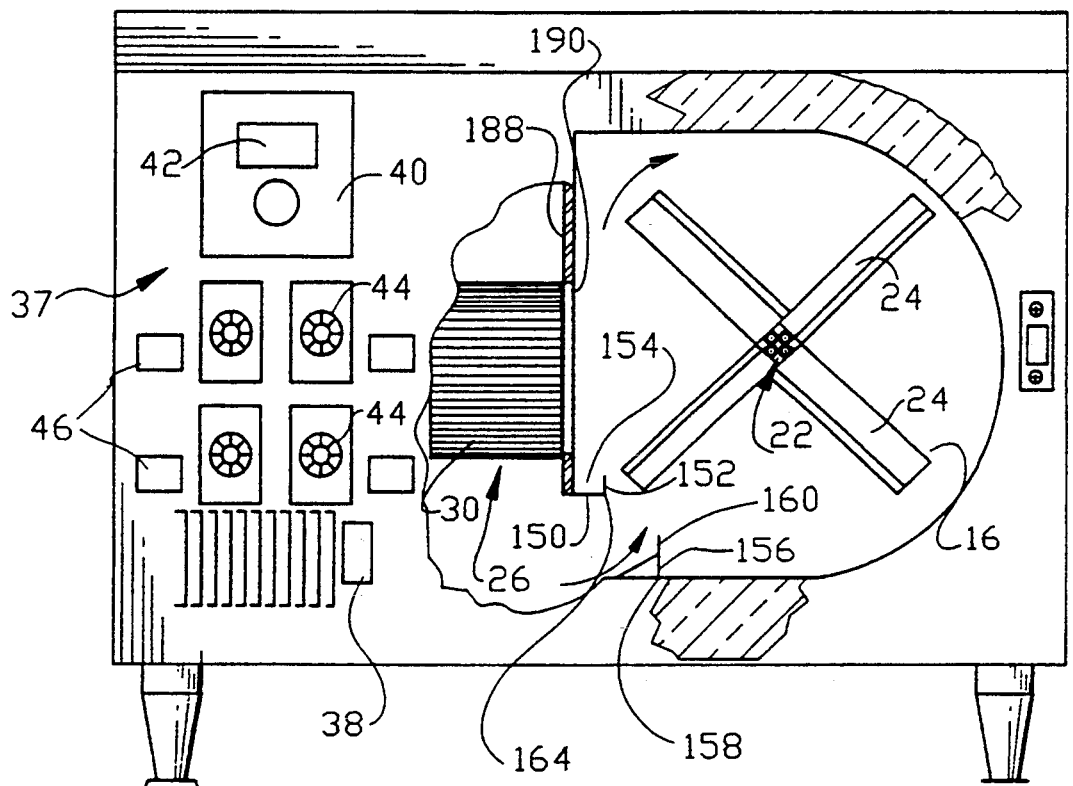
FIG. 3 is a front elevational view of the oven of the present invention, with the oven door removed and also portions of the front wall removed for purposes of illustration.

To provide for the proper circulation of the heating air through the oven chamber 16 defined by the insert 14, there is provided at the lower left corner portion of the insert 14 a nozzle structure 146 (see FIGS. 2B and 3). This nozzle structure 146 has, in transverse cross-sectional configuration, the general configuration of a right angle triangle, with the hypotenuse facing upwardly and toward the right, and with the corners at the hypotenuse locations being somewhat flattened.

More specifically, this nozzle structure 146 has a front end plate 148 which defines the forward part of the aforementioned slot like opening or nozzle 34 through which air passes into the oven chamber 16. This first pate 148 guides the air flow through the nozzle 34 so that this air (carrying various gaseous and/or particulate material) from the nozzle does not impinge on the interior door surface and it associated seal. There is a nozzle side wall portion which comprises first an upper horizontal wall portion 150 having a relatively short width dimension and which extends along the length of the oven chamber 16. Extending a short distance upwardly from the right edge of the wall 150, is a flange member 152 which forms a U shaped recess 154 which serves the function of a crumb retaining area. As will be described later herein, with the hot air circulating through the oven chamber 16, there is a tendency for small particles of food to become airborne. It has been found that by providing this flange 152, these food particles will collect in this U shaped recess 154 where these can conveniently be removed from time to time. Also this helps take the crumbs out of the airstream so that these do not impinge on the food product.

The nozzle defining structure 148 also comprises a lower right wall portion 156 that extends from the lower right edge of the plate 148 to the rear of the insert 14. It will be noted that this right plate 156 has a relatively short height dimension, and there is another plate 158 which extends from the plate 156 downwardly and to the left at a moderate slant to define a lower surface of the exit portion of the nozzle or opening 34. The plate 156 extends upwardly beyond the right edge of the plate 158 to provide an upstanding flange 160. It has been found that this upstanding flange 160 causes a desired upward deflection of the air passing through the opening 34 so that to the right of the flange 160 there is something of a circulating eddy current. The effect of this is that food particles, crumbs, grease or oil collect in what is akin to a dead air space 162 just above the lower plate 142 of the insert 14 and just to the right of the wall 156. As the crumbs and other food particles collect in this dead air space, indicated at 162, these can be removed at periodic intervals. Thus the crumbs collect in both the recess 154 and in the dead air space at 162.

The upper edge of the flange 160 is spaced downwardly and to the right of the forward edge 164 of the wall 150 so as to define the nozzle or opening 34 in a manner that this nozzle or opening 34 is directed upwardly and to the right at an angle of about 45° to the horizontal, so that the air flow of hot air is in that direction. There is a closure plate 166 which extends from the rear edge of the nozzle 34 rearwardly to the rear end of the insert 14 so as to close the lower left hand portion of the insert 14 rearwardly of the nozzle or opening 34.

The oven housing 12 is provided with an intermediate wall structure 168 that extends rearwardly from the front wall of the housing 12 to the rear wall of the housing 12. (See FIG. 2B.) This wall 168 has a main wall portion 170 which fits closely against the left wall 138 of the insert 14. The forward part of this wall 168 defines a recessed area 172 in which the squirrel cage fan 30 and the heating elements 32 are located. This recess 172 has its rear, upper and forward side portions formed with a spiral-like curved wall 174 which extends in something of a curved spiral from a lower edge 176 through approximately 270° to a forward location 178.

The aforementioned fan 30 is approximately centrally located within this side wall 174, and the heating elements 132 extend in approximately a 180° arc within the forward, upper and rear area around the squirrel cage fan 30. There is a left wall 180 which covers the areas at the left edge of the wall 174 so as to close off the left side of the recessed area 172.

When the insert 14 is placed within the oven housing 12, the left wall 138 of the insert 14 encloses the recessed area 172 and also forms with the wall 170 a securely enclosed area which prevents crumbs or food particles from moving out of the normal air circulating path and into any small gap that might exist between various parts of the insert 14 and the rest of the structure. To facilitate this, there is provided a small radially inward extending peripheral lip 182 which extends around the right edge of the curved wall 174 also along the front right edge 184 of the area 172, and also at the bottom edge at 186. (see FIG. 2B).

The right edge 188 of the squirrel cage fan 30 fits closely adjacent to the circumferential edge 190 defining the opening 28. (See FIG. 3.) Thus, in the operation of the fan 30, the air is drawn through the opening 28 into the interior of the fan 30, with the air being moved radially outwardly from the squirrel cage fan 30 in a generally circular flow path around the fan 30, and with this air passing through the heating elements 32 and being discharged through the aforementioned slot like nozzle or opening 34.

Figure 4:
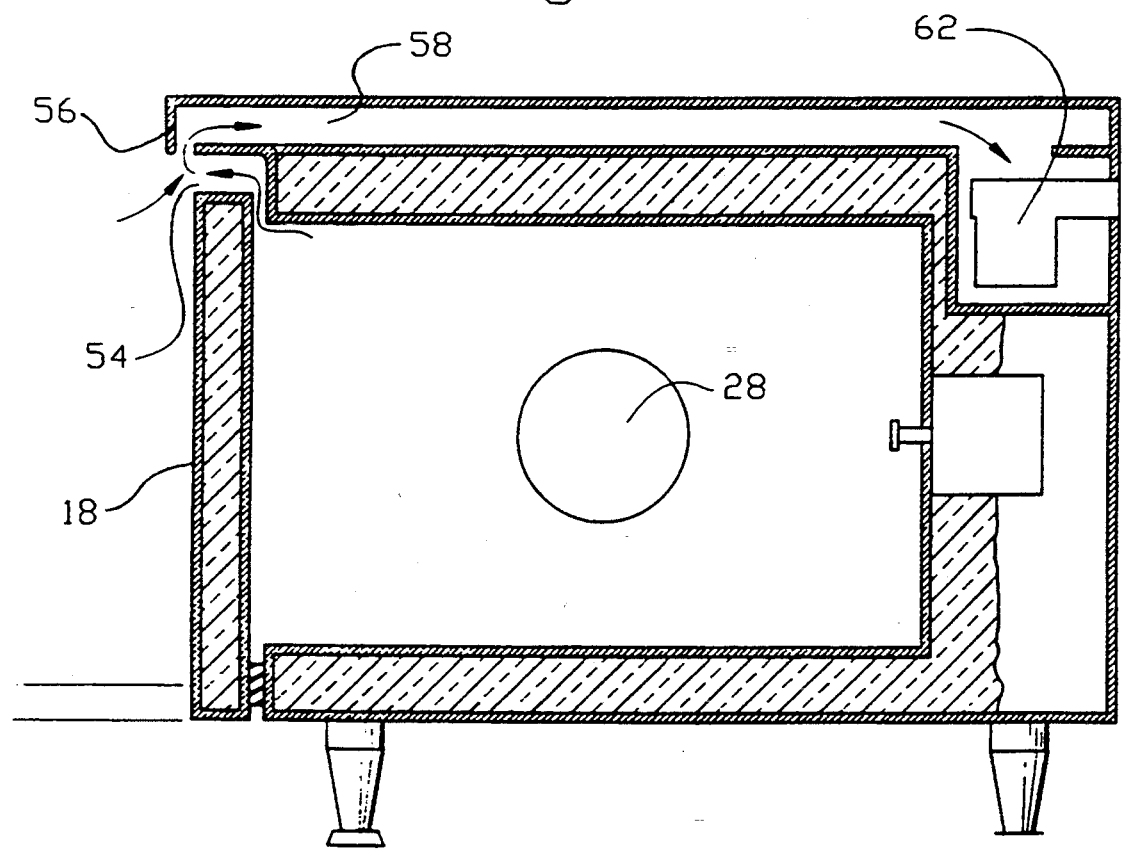
FIG. 4 is a sectional view taken along a longitudinally aligned plane through the oven chamber.
Figure 5:
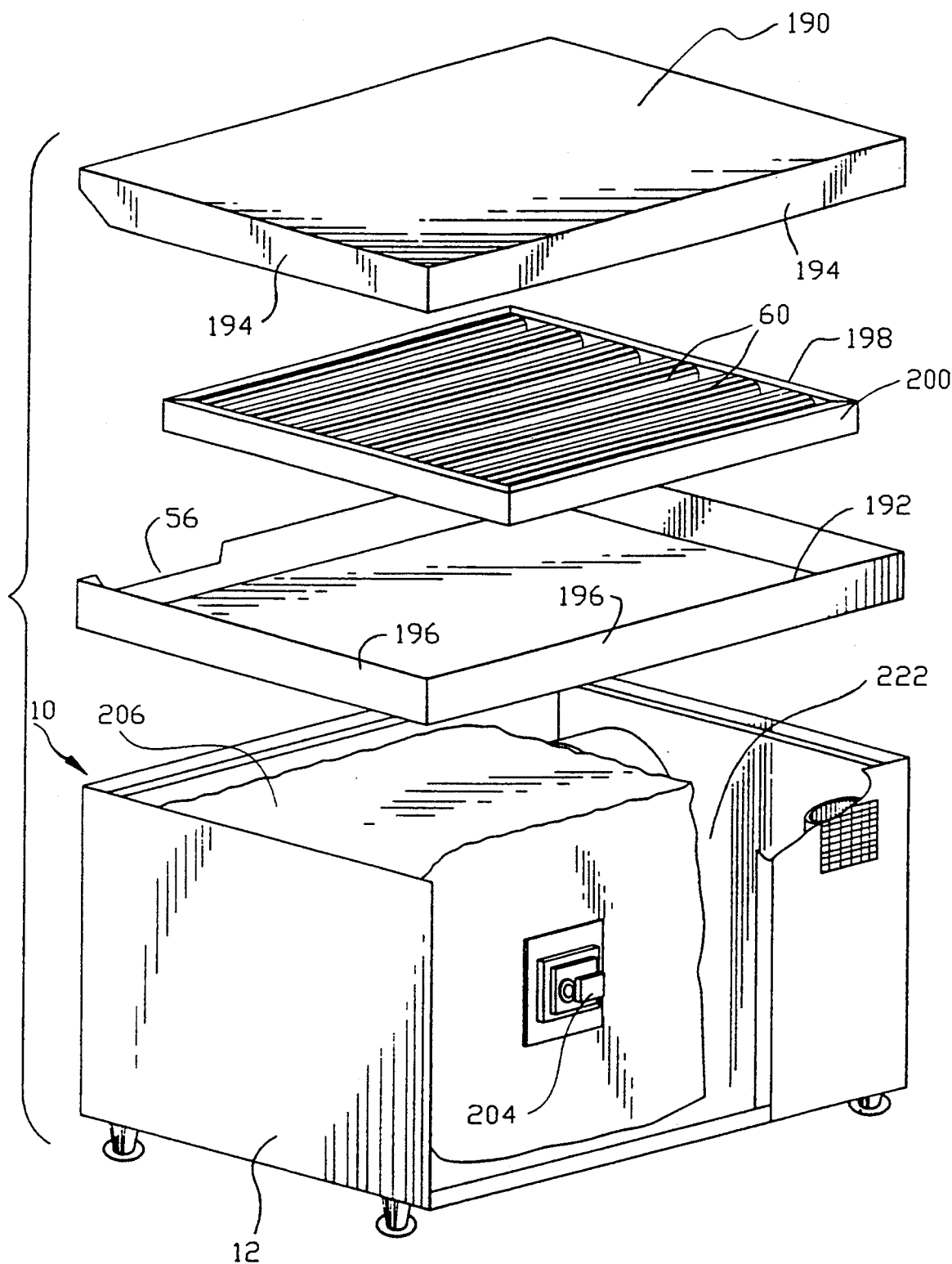
FIG. 5 is an isometric view of the present invention taken from a location behind, above and to one side of the oven, with portions of the back wall being removed for purposes of illustration, and also with upper components being shown spaced from one another for purpose of illustration.

To proceed further with a description of other portions of the oven 10, reference is now made to FIGS. 2 and 5. It can be seen that the top part of the stove housing 12 is made up of a pair of upper and lower cover plates 190 and 192, respectively, which have respective side flanges 194 and 196 which interfit with one another to define the aforementioned condensing chamber 58. The forward side wall of the lower member 192 has a cut out portion to provide the aforementioned slot like opening 56. The aforementioned baffles 60 are in the present embodiment formed as a single modular unit 198 having a peripheral frame 200 across which extend the actual baffle members 60. The left rear corner of the lower plate 192 is formed with a through opening 202 which leads to the aforementioned exhaust fan 62. As indicated previously, this fan 62 operates continuously when the main power switch 38 is closed, so that whether the oven door 18 is open or shut, air and fumes from the oven chamber 16 are drawn through the condensing chamber 58. (FIG. 4 shows the components forming the condensing chamber 58 somewhat schematically for purposes of illustration, while FIGS. 2 and 5 show the actual preferred configuration.)

With reference to FIG. 5, there is shown a motor 204 which operates through an appropriate drive transmission to rotate the mounting rod 22. Also, as can be seen in FIGS. 2, 4 and 5, there is provided insulating material 206 which completely surrounds the portions of the oven 10 which are heated. It can be seen, with reference to FIG. 3, that the housing 12 defines an inner side wall 208 which has generally the same configuration as the side wall 136 and top and bottom walls 140 and 142, and the insulation 206 is positioned around that wall 208 and also to the left side of the intermediate wall 170. Further, the insulation extends along the back wall 106 (see FIG. 10).

Figure 12:
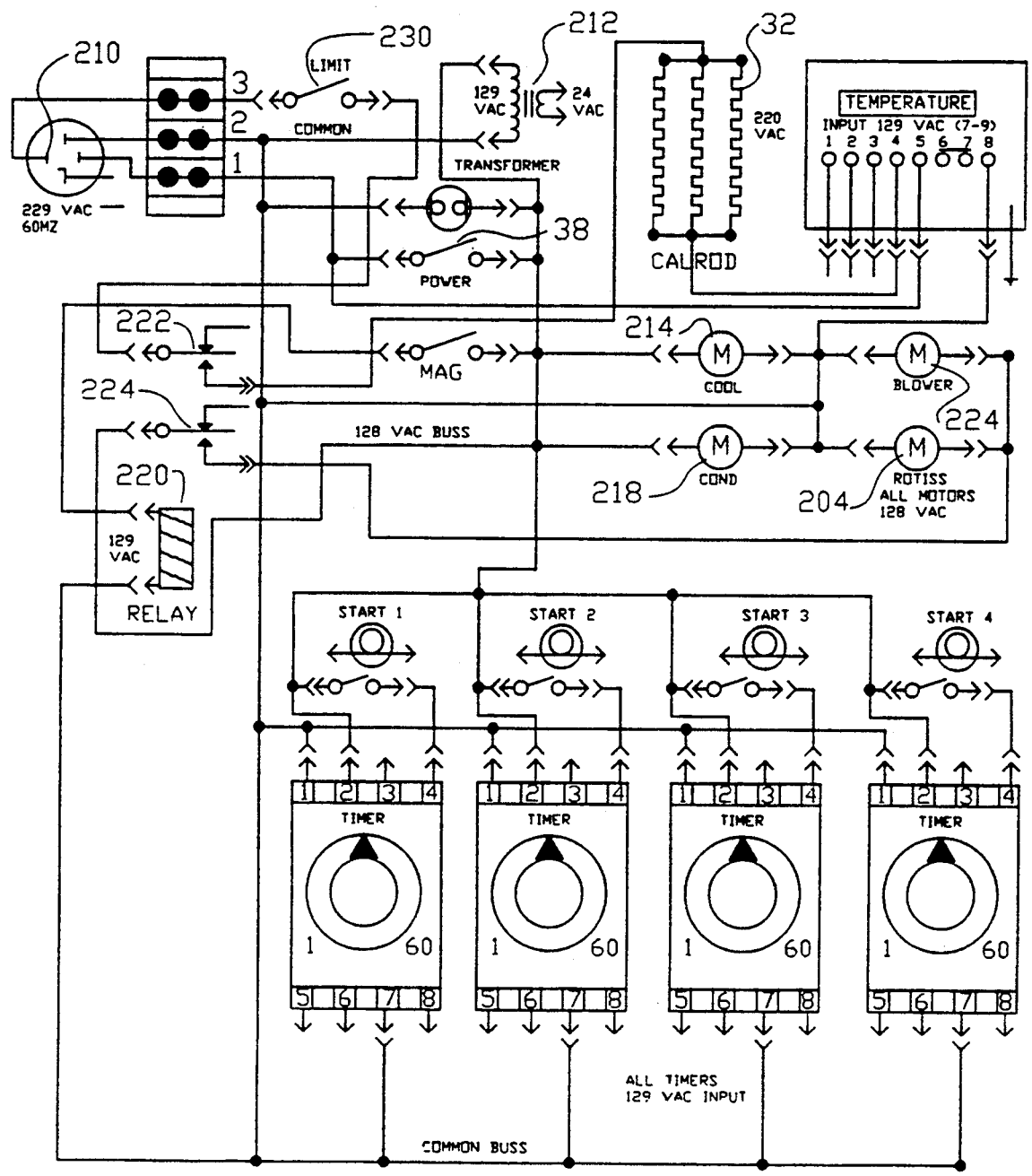
FIG. 12 is a circuit diagram of the control apparatus of the present invention.

To describe the control system of the present invention, reference is made to FIG. 12. There is a 220 volt electrical power source 210 having three output lines.

The main power switch 38 is connected in series with the interlock switch 64 which (as mentioned previously) is closed when the door 18 is shut. With the main power switch 38 and the interlock switch 64 closed, power is delivered to all of the components of the oven 10. More specifically, the switch 38 supplies power to a transformer 212 to supply 24 volt power to a number of the operating components. Also, the switch 38 supplies power directly to a motor 214 that drives a cooling fan which provides cooling air to various operating components positioned in the left hand chamber 216 within the housing 12. (Since the precise place for the various components in the chamber 216 is not critical to the present invention, this will not be described in detail herein.) Also, current is supplied directly through the main switch 38 through a motor 218 which operates the aforementioned exhaust fan 62. Thus, with the main power switch 38 closed, these two motors 214 and 218 operate whether or not the door 18 is closed so as to close the interlock switch 64 is closed.

The interlock switch 64 is connected in series to the main power switch 38, so that the interlock switch, when closed, transmits current only when the main power switch 38 is closed. This interlock switch 64 is in turn connected to a relay 220 which, when energized, closes two switches 222 and 224. The switch 222, when closed, transmits power to the aforementioned heating elements 32. The switch 224, when closed, delivers power to the aforementioned motor 204 that rotates the mounting rod 22, and also delivers power to a motor 226 that operates the aforementioned squirrel cage fan 30. Thus, when the door 18 is open, the interlock switch 64 is opened so that the motors 204 and 224 stop rotating, and power is not delivered to the heating elements 32. Each of the timers 228 associated with respective timing switches 44 is connected in series with the interlock switch 64 so that each timer 228 does not count time unless the door 18 is shut.)

The main power switch 38 is connected directly to the timers 228 associated with each of the timing switches 44. Also, there is a limit switch 230 which is connected in series with the switch 222. This limit switch 230 opens to stop current flowing to the heating elements 32 when a predetermined upper temperature limit (e.g. 500 degrees F. ) is reached.

Figure 13:
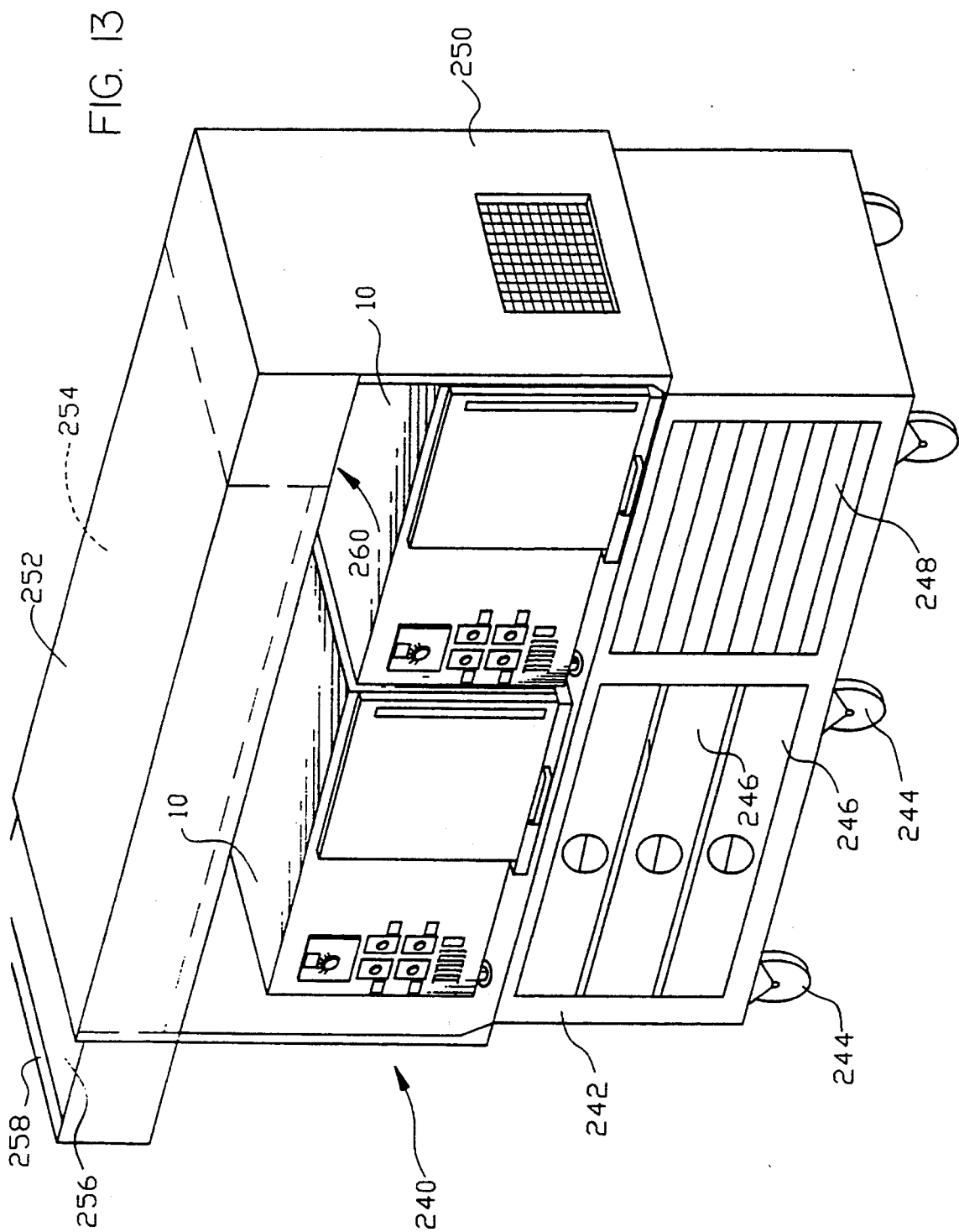
FIG. 13 is an isometric view of two of the ovens of the present invention incorporated in an operating assembly.

Another facet of the present invention is that the oven. 10 can be incorporated in combination with other components to form an operating unit for a restaurant. Such an operating unit is shown at 240 in FIG. 13. It can be seen that there is a lower support frame 242 resting on a set of wheels 244. On the left side of the frame 242, there are three drawers 246 to contain food products. On the right hand side of the frame 242, there is a condensor motor to provide refrigeration or freezing. This also cools the area occupied by the drawers 246.

There is an upper frame section 250 that is bolted to the lower frame 242. As shown herein, there are two ovens 10 placed side by side within the frame section 250, with these ovens 10 resting on the upper surface of the lower frame section 242.

A suitable hood section 252 is mounted to the upper frame section 250 above the location of the two ovens 10. This hood section incorporates an electrostatic filter 254 with an intake fan and also a charcoal filter 256. Since these can be of conventional design, these filters 254 and 256 will not be described in detail herein. The hood 252 can be lifted upwardly to remove the electrostatic filters for cleaning and repair. Likewise, a door 258 is provided for access to the charcoal filters so that these also can be removed and replaced. The air and fumes from the ovens 10 are drawn into the hood at 260 to pass through the filters 254 and 256.

To review the overall operation of the present invention, let it be assumed that the oven 10 is operating in a restaurant. When the restaurant is to be opened for the day, the thermostat switch 40 is set at the desired temperature level, the main power switch 38 is closed, and the switch for the electrostatic and charcoal filter in turned on to activate the filter. As indicated previously, with the door 18 closed so that the interlock switch 64 is also closed, closing of the main power switch 38 starts the operation of all of the operating components of the oven 10. More specifically, power is delivered to the heating elements 32, the squirrel cage fan 30 starts operating to circulate air through the oven chamber 16, and the mounting rod 22 begins to rotate. Also, the venting fan 62 and the motor 216 that operates a cooling fan in the chamber 16 begins to operate. Within a very short period of time, the oven 10 is generating adequate heat to begin the cooking operation.

When an order is taken, the restaurant worker places the food order in one of the baskets 24, closes the basket lid 76, opens the door 18, and then inserts the basket into the oven chamber 16. As described previously, this is done by aligning the openings 90 and 94 of the basket 24 with one of the prongs 48 and sliding the basket rearwardly into the oven chamber 16 so that the selected prong 48 extends through the bracket openings 90 and 94. As discussed previously with reference to FIGS. 6A and 6B, this not only holds the lid 76 closed, but mounts the basket 24 in such a way that it is securely held in a fixed angular position relative to the rod 22. The mounting rod 22 can be at any position, and yet any one of the four baskets 24 can be inserted or removed.

After the basket 24 is mounted on a particular prong 48, the color of the tip 50 of that selected prong is observed, and the restaurant worker then selects the timing switch having an operating button 46 with a color corresponding to the color of the tip 50 of the selected mounting prong 48. The restaurant worker then sets the timer 228 of that selected timer to the appropriate setting corresponding to the desired cooking time of the food product in the basket 24.

It will be noted that when the door 18 is opened, the interlock switch 64 opens to interrupt power to the motor 204 that rotates the rod 22 and also interrupts power to the motor 224 which causes the fan 30 to operate, thus stopping the circulation of air through the oven chamber 16. Also, power to the heating elements 32 interrupted. When the door 16 is closed, the switch 64 closes so that these components again begin operating so that hot air is circulated through the oven chamber 16. Also when the oven door 16 is closed, the closing of the interlock switch 64 causes the timer 228 of the selected switch 44 to start counting time.

The rod 22 makes about one and one-half revolutions per minute. As the hot air exits from the nozzle 34, it passes through the perforations in the basket 24 so as to supply heat to the food product in the basket 24. As indicated previously, the front and rear walls 74 of each basket 24 are made imperforate so that the flow of hot air is channeled through the interior of each basket 24.

Let it now be assumed that the restaurant worker takes a second order. As described previously herein, the food for the second order is placed in one or more baskets 24, and these baskets 24 are inserted in the oven chamber 16 in the same manner as described above. Also, when the door 16 is opened, the rod member 22 stops rotating, the air circulating fan 30 stops operating, and power to the heating elements 32 is interrupted. However, since power is still being delivered to the motor 218 that drives the fan 62, air continues to be drawn through the slot 56 and through the condensing chamber 58. Thus, fumes from the oven chamber 16 will tend to be drawn upwardly and into the slot 56 to pass through the baffles 60 in the condensing chamber 60.

Also, as can be seen in FIG. 4, when the oven door is closed, the gases which are generated in the cooking operation (e.g. fumes and evaporated water, along with heated air) will pass upwardly through the opening 54 and into the opening 56 to pass through the condensing chamber 58. Also ambient air is drawn into the opening 56 to reduce the temperature of the total amount of air passing into the condensing chamber 58. The ratio of air flow is between about 70% of ambient air (sometimes higher) to about 30% (or less) of air from inside the oven chamber 16.

Further, as indicated previously, when the door is opened the second time, and with the first food product inserted in the oven chamber 16 being only part way through its cooking cycle, the particular timer 228 of the switch 44 associated with the food product first inserted into the oven chamber 16 stops until the door 16 is again closed. Then that particular timer 228 continues to count time for that food product which was first inserted in the oven chamber 16.

At the completion of the cooking cycle of the first food product inserted into the oven, a light in the corresponding timer switch 44 goes out and also (in a preferred embodiment) begins transmitting a signal, either visual (e.g. causing the light to flash) or audible (e.g. a beeping sound).

The air that is circulated by the fan 30 through the oven chamber 16 can reach peak velocities as high as eighty feet per second, and it is expected that crumbs or other small particles of food can become airborne. As indicated previously, it has been found that the arrangement of the flange 152 (forming the channel 154) and also the flange 160, (providing the dead air space 162) provide locations where these crumbs and other food particles accumulate. It will be noted that there is provided beneath the right side of the housing 12 a crumb tray 260 which is positioned beneath the open front end of the oven chamber 16. The crumbs in the channel 154 and in the dead air space 162 can then be wiped or brushed outwardly into the crumb tray 260.

With regard to other features of the functioning of the present invention, these have either been mentioned previously herein or are believed to be reasonably evident from the preceding description. Also, it is to be understood that various modifications could be made to the present invention without departing from the basic teachings thereof.

What is claimed:

1. A food heating apparatus to heat for selected time cycles a plurality of food portions, said apparatus comprising:
   a. a housing defining a heating chamber;
   b. a carrying assembly located in said chamber comprising:
      i. a plurality of basket means, each of which is arranged to contain a related food portion to be heated;

ii. a mounting structure having mounting means by which each of said basket means can be mounted at selected mounting locations;

iii. said carrying assembly comprising first identifying means which in turn comprises a plurality of first indicia each corresponding to and identifying a respective one of said basket means in said heating chamber;

c. a control system comprising:

i. timing means to provide a plurality of independent time indicators, each of which can be set for a predetermined timing cycle;

ii. second identifying means corresponding to said first identifying means and having second indicia associated with each of said time indicators by which each of said timing devices can be selectively associated with individual basket means at said mounting structure, whereby each basket means can be inserted in said heating chamber and a related timing device identifiably related with that basket means can be set to a predetermined timing cycle so that a period of time during which that food product is heated in the oven chamber can be ascertained.

2. The apparatus as recited in claim 1, wherein said first indicia comprises a plurality of identifying elements, each of which is identifiably associated with a related mounting location at said mounting structure.

3. The apparatus as recited in claim 2, wherein said mounting structure comprises a plurality of mounting members, each of which is identifiably associated with a related one of said identifying elements.

4. The apparatus as recited in claim 3, wherein each of said mounting members comprises a rod means to which a related basket means can be selectively mounted.

5. The apparatus as recited in claim 1, wherein said mounting structure is rotatably mounted in said heating chamber, said apparatus further comprising mounting structure drive means to rotate said mounting structure in a manner that each of said basket means mounted to said mounting structure can be rotated in said oven chamber.

6. The apparatus as recited in claim 1, wherein said apparatus comprises hot air circulating means arranged to heat air and circulate said heated air through said oven chamber.

7. The apparatus as recited in claim 6, wherein said mounting structure is rotatably mounted in said heating chamber, said apparatus further comprising mounting structure drive means to rotate said mounting structure in a manner that each of said basket means mounted to said mounting structure can be rotated in said oven chamber.

8. The apparatus as recited in claim 1, wherein said housing has a front side and a rear side and a door mounted at the front side of the heating chamber for movement between open and closed positions, said mounting structure being rotatably mounted in said oven chamber about a longitudinal axis of rotation that is horizontally aligned and extends in a front to rear direction, said mounting locations being at angularly spaced locations relative to said axis of rotation, said mounting means and said basket means being arranged in a manner that each of said basket means can be removably mounted to said mounting means by being moved from a front location of the oven chamber rearwardly into the oven chamber so as to come into mounting engagement with the mounting means, with the mounting means being arranged so that at least two of said basket means can be mounted simultaneously at respective mounting locations.

9. The apparatus as recited in claim 8, wherein said mounting means comprises a plurality of longitudinally extending rod means, each of said rod means being adapted to come into mounting engagement with a related one of said basket means.

10. The apparatus as recited in claim 8, wherein said first indicia comprises a plurality of identifying elements, each of which is associated with a related one of said mounting locations on said mounting means whereby each basket means can be identified by location of said basket means on said mounting means.

* * * * *